(12) United States Patent
    Jochman

(10) Patent No.: US 12,651,941 B2
(45) Date of Patent: Jun. 9, 2026

(54) POWER SYSTEMS HAVING ROTOR-MOUNTED FAN BLADES

(71) Applicant: Illinois Tool Works Inc., Glenview, IL (US)

(72) Inventor: Nathan Joe Jochman, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 406 days.

(21) Appl. No.: 17/678,750

(22) Filed: Feb. 23, 2022

(65) Prior Publication Data

US 2023/0268802 A1     Aug. 24, 2023

(51) Int. Cl.
H02K 9/06          (2006.01)

(52) U.S. Cl.
CPC ...................................... H02K 9/06 (2013.01)

(58) Field of Classification Search
CPC .......... H02K 9/06; H02K 7/1815; H02K 1/26; H02K 1/265
See application file for complete search history.

(56) References Cited

U.S. PATENT DOCUMENTS

2002/0094275 A1*   7/2002   Bostwick .............. F04D 29/281
                                                            416/185
2010/0314372 A1*  12/2010  DuVal .................. B23K 9/1006
                                                            219/133

| | | |
|---|---|---|
| 2016/0226366 A1 | 8/2016 | Bangura |
| 2017/0025926 A1* | 1/2017 | Lee .......................... H02K 3/527 |
| 2017/0179789 A1* | 6/2017 | Endo ..................... H02K 27/00 |
| 2018/0200823 A1* | 7/2018 | Huang ................... H02K 19/16 |
| 2019/0229592 A1* | 7/2019 | Tam ........................ H02K 7/003 |

FOREIGN PATENT DOCUMENTS

CN           110380575 A  * 10/2019   .............. H02K 9/06

OTHER PUBLICATIONS

CN-110380575-A Machine Translation (Year: 2019).*
Liddell et al., "Redesigning the Rotor Fan Blades to Improve the Cooling of Roxburgh's Hydro-Generators", 14th Australasian Fluid Mechanics Conference Adelaide University, Adelaide, Australia Dec. 10-14, 2001.

* cited by examiner

*Primary Examiner* — Oluseye Iwarere
*Assistant Examiner* — Masoud Vaziri
(74) *Attorney, Agent, or Firm* — McAndrews, Held & Malloy, Ltd.

(57)                     ABSTRACT

Disclosed power systems include an engine configured to output mechanical power via a shaft and a generator coupled to the shaft. The generator includes a rotor assembly and a stator assembly. The rotor assembly includes a rotor winding, a rotor core coupled to the shaft and mechanically supporting the rotor windings with respect to the shaft, an insulating shell between the rotor core and the rotor winding, and a plurality of fan blades extending from an axial end face of the rotor core. The fan blades are configured to generate an airflow proximate the rotor assembly while the rotor assembly is being rotated by the shaft.

19 Claims, 4 Drawing Sheets

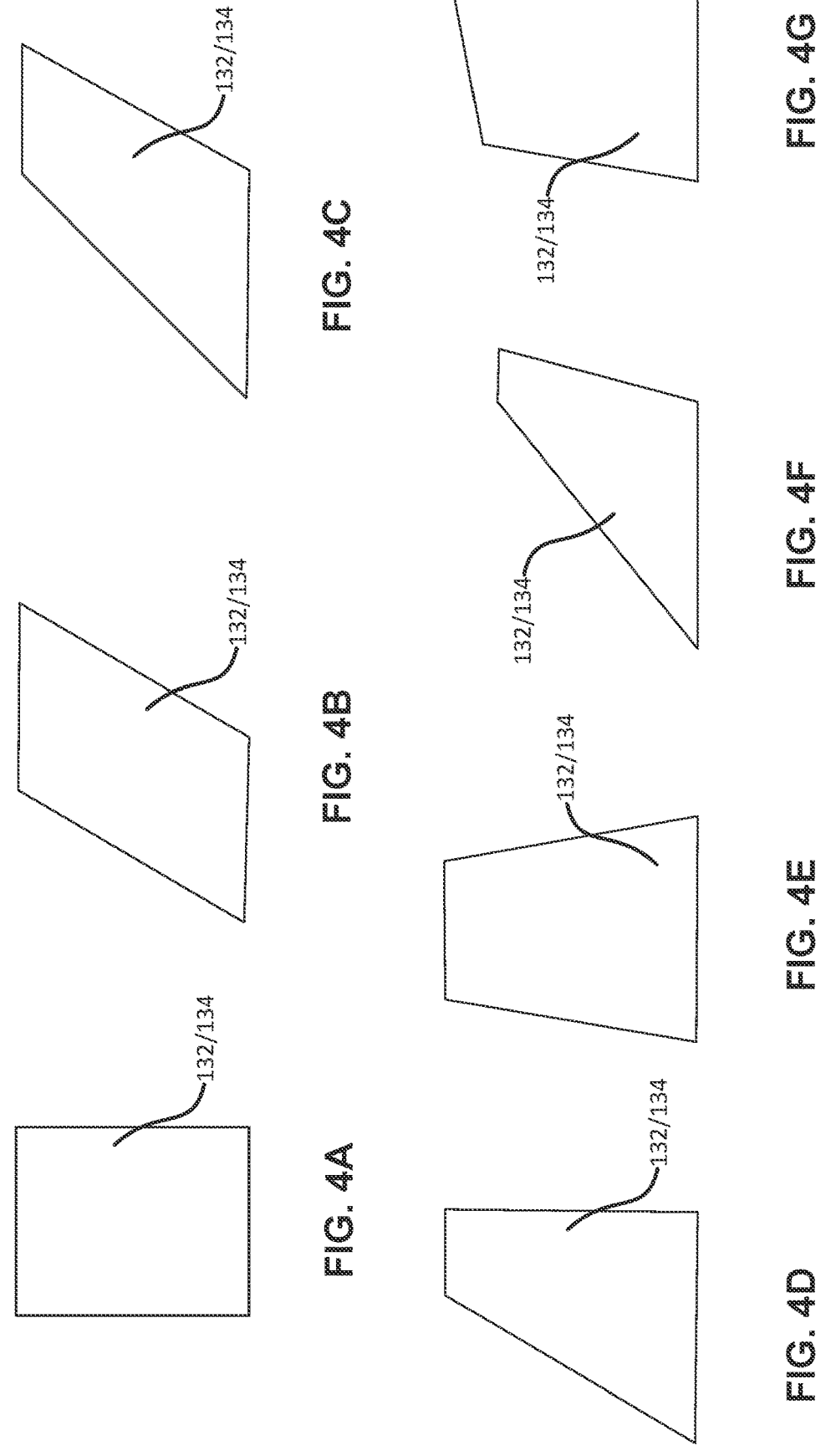

POWER SYSTEMS HAVING
ROTOR-MOUNTED FAN BLADES

FIELD OF THE DISCLOSURE

This disclosure is directed generally to power systems and, more particularly, to power systems having rotor-mounted fan blades.

BACKGROUND

Conventionally, engine-driven power systems (e.g., generators/air compressors/welders) are contained within a metal enclosure that provides environmental protection for the equipment and provides a safety, sound, and aesthetic barrier for the operators. Many different types of enclosures have been used for conventional power systems. Conventional enclosures are configured with components in such a way as to house the engine and/or generator components based on their relative locations. Moreover, enclosures typically include one or more cooling fans to circulate air and cool the engine and/or generator components.

SUMMARY

Power systems having rotor-mounted fan blades, substantially as illustrated by and described in connection with at least one of the figures.

BRIEF DESCRIPTION OF THE DRAWINGS

FIGS. 4A-4G are block diagrams illustrating various example implementations of the fan blades of FIGS. 1-3.

The figures are not necessarily to scale. Where appropriate, similar or identical reference numbers are used to refer to similar or identical components.

DETAILED DESCRIPTION

Engine-driven power systems, which generate and output one or more types of mechanical, electrical, pneumatic, hydraulic, and/or other types of power, rely on circulating air through an enclosure to cool one or more components within the enclosure. For example, conventional power systems include a generator fan or an engine fan to promote cooling airflow through the generator. Generator fans and/or engine fans are driven by the output of the engine. The air directed through the generator by the engine fan and/or generator fan help cool the generator components (e.g., a stator assembly and a rotor assembly). In such conventional power systems, the air directed through the generator by the fan takes the path of least resistance through the generator (e.g., in an axial direction through the generator). The air directed through the generator by the fan in this manner is not directed into and/or through the windings of the stator assembly or the rotor assembly. As a result, conventional power systems have reduced cooling performance.

Disclosed example power systems are provided with improved cooling by including a plurality of fan blades on one or both axial end faces of a rotor assembly of a generator. The disclosed example power systems include the plurality of fan blades as well as the rotor fan of the conventional power systems. In this way, multiple air flows are created within the generator (e.g., one in a primarily axial direction through the generator and one in a primarily circumferential direction within the generator). The plurality of fan blades provides the air flow in the circumferential direction, as well as increasing turbulence within the generator to improve cooling of the rotor assembly and/or the stator assembly. The air flow in the circumferential direction cools at least one of a stator assembly or a rotor assembly of the generator. For example, the air flow may be routed within one or both of a rotor winding or a stator winding.

The disclosed example power systems, including the plurality of fan blades in addition to the rotor fan, have improved cooling as compared to conventional power systems. In some examples, because of the improved cooling due to the plurality of fan blades, the rotor fan may be smaller than in conventional power systems and still achieve sufficient cooling of the generator. Additionally, or alternatively, the plurality of fan blades as disclosed herein provide improved mechanical support of the rotor windings of the rotor assembly in comparison to conventional power systems.

Figure 1:
FIG. 1 is a block diagram of an example power system including a plurality of fan blades extending from an axial end face of a rotor assembly, in accordance with aspects of this disclosure.

FIG. 1 is a block diagram of an example power system 100 including a plurality of fan blades 132, 134 extending from an axial end face 124, 126 of a rotor assembly 116. The power system 100 may be used for various applications, such as, for example, providing compressed air, generating power, pumping, and/or welding support. As illustrated in FIG. 1, the power system 100 includes an enclosure 102. The enclosure 102 protects internal components of the power system 100 from the environment, as well as providing a safety, sound, and aesthetic barrier for an operator using or within range of the power system 100. The enclosure 102 is primarily constructed with sheet metal, and may include multiple panels. One or more of the panels may be removable and/or one or more of the panels may open, to permit access.

The example power system 100 of FIG. 1 is an engine-driven power system. The system 100 includes an engine 104 that drives a generator 106 to generate electrical power. The engine 104 may be an internal combustion engine, a diesel engine, a fuel cell, etc. The engine 104 is configured to output mechanical power to drive the generator 106. The engine 104 receives fuel from a fuel tank 108.

In some examples, the power system 100 includes one or more power subsystems. For example, the generator 106 may provide the electrical power to welding-type conversion circuitry 109 configured to output welding-type power, an air compressor 111 configured to output pneumatic power, a hydraulic pump 113 configured to output hydraulic power, auxiliary power conversion circuitry 115 configured to output AC power and/or DC power (e.g., DC and/or AC electrical output(s)), and/or any other load device. The example hydraulic pump 113 and the air compressor 111 may be powered by mechanical power from the engine 104 and/or by electrical power from the generator 106.

In some examples, an external power supply subsystem 117 may be coupled (e.g., plugged in, hardwired, etc.) to the power system 100 to convert at least one of the AC power or the DC power from the auxiliary power conversion circuitry 115 and/or the generator 106 to at least one of AC power or DC power, such as to power external devices that have different power requirements. The example external power supply subsystem 117 may also be communicatively coupled to control circuitry of the power system 100 (e.g., wirelessly, via power line communication, via a communication cable, etc.) to enable the control circuitry to control the demand and/or output of the external power supply subsystem 117.

The welding-type conversion circuitry 109 converts output power from the generator 106 (e.g., via the intermediate voltage bus) to welding-type power based on a commanded welding-type output. The welding-type conversion circuitry 109 provides current at a desired voltage to an electrode and a workpiece via output terminals to perform a welding-type operation. The welding-type conversion circuitry 109 may include, for example, a switched mode power supply or an inverter fed from an intermediate voltage bus. The welding-type conversion circuitry 109 may include a direct connection from a power circuit to the output (such as to the weld studs), and/or an indirect connection through power processing circuitry such as filters, converters, transformers, rectifiers, etc.

The auxiliary power conversion circuitry 115 converts output power from the generator 106 (e.g., via the intermediate voltage bus) to AC power (e.g., 120 VAC, 240 VAC, 50 Hz, 60 Hz, etc.) and/or DC power (e.g., 12 VDC, 24 VDC, battery charging power, etc.). The auxiliary power conversion circuitry 115 outputs one or more AC power outputs (e.g., AC outlets or receptacles) and/or one or more DC power outputs (e.g., DC outlets or receptacle). The power system 100 enables multiple ones of the power subsystems (e.g., the hydraulic pump, the air compressor 111, the welding-type conversion circuitry 109, the auxiliary power conversion circuitry 115, the external power supply subsystem 117, etc.) to be operated simultaneously.

In some examples, the power system 100 includes a user interface 119. The user interface 119 includes an input device configured to receive inputs selecting mode(s) representative of welding-type processes, mode(s) representative of one or more battery charging modes, mode(s) representative of a vehicle load, and/or other modes such as a pneumatic load and/or a hydraulic load.

In addition, in some examples, the power system 100 may include a muffler 110. In some such examples, the muffler 110 may function as an exhaust of the engine 104. The example power system 100 may include other components not specifically discussed herein, or may omit one or more of the components discussed herein. The components of the power system 100 may be arranged within the enclosure 102 in any suitable configuration.

As seen in FIG. 1, the generator 106 includes a rotor assembly 116 and a stator assembly 114. The rotor assembly 116 is coupled to a rotor shaft 118 (e.g., arranged about the rotor shaft 118). In some examples, the rotor shaft 118 is coupled to the engine 104 via a drive connection (e.g., a threaded connection). For example, the rotor shaft 118 may include a first aperture having female threads and configured to receive male threads of an engine shaft 138 of the engine 104. The engine 104 outputs mechanical power via the engine shaft 138.

In some examples, one or more components of the generator 106 are entirely or partially enclosed within a housing 112. In some examples, the housing 112 includes one or more pieces which attach the generator 106 to the engine 104, connect the generator 106 to the enclosure 102 and/or other support structure to physically support the generator 106, provide support for the rotor shaft 118, and/or provide a cooling airflow pathway around the stator 114 and/or rotor assemblies 116. In other examples, the generator 106 may omit a housing.

The stator assembly 114 includes a stator core 130 and stator windings 128. The stator core 130 mechanically supports the stator windings 128. The rotor assembly 116 includes a rotor core 120 and rotor windings 122. The rotor core is coupled to the rotor shaft 118. The rotor core 120 mechanically supports the rotor windings 122 with respect to the rotor shaft 118. The rotor assembly 116 rotates (e.g., when driven by the mechanical power output by the engine shaft 138) relative to the stator assembly 114 to generate electrical power.

The rotor assembly 116 has one or more axial end faces 124, 126. For example, the rotor core 120 illustrated in FIG. 1 defines a first axial end face 124 and a second axial end face 126. The first axial end face 124 is opposite the second axial end face 126. In some examples, there is space between the axial end faces 124, 126 of the generator 106 and the housing 112 itself and/or a fan 136 (within the housing 112). In other examples, the rotor core 120 may have one or more additional or alternative faces.

In some examples, the rotor assembly 116 further includes an insulating shell 121 between the rotor core 120 and the rotor windings 122. In examples including the insulating shell 121, the insulating shell 121 electrically insulates the rotor windings 122. The insulating shell 121 also mechanically supports the rotor windings 122 on the rotor assembly 116. The insulating shell 121 may be made of any suitable insulative material, such as, for example, plastic. In examples in which the rotor assembly 116 does not include the insulating shell 121, the rotor assembly 116 may include an insulative coating on at least a portion of the rotor core 120. Similar to the insulating shell 121, the insulative coating electrically insulates the rotor windings 122. In other examples, the power system 100 includes both the insulating shell 121 and an insulative coating. In yet other examples, an air gap may electrically insulate the rotor windings 122.

The power system 100 includes a fan 136. The fan 136 is driven by rotation of the engine shaft 138 and/or the rotor shaft 118. The fan 136 directs air through the housing 112. The air can enter and exit the housing 112 at any number of locations, openings, gratings, etc. The air directed into the housing 112 by the fan 136 cools the rotor assembly 116 and/or the stator assembly 114 of the generator 106. For example, the fan 136 directs air through the generator 106 in an axial direction. In this way, the air directed through the generator 106 (e.g., through the housing 112) by the fan 136 alone may take the path of least resistance through the generator and is not directed into and/or through the windings 122, 128 of the stator assembly 114 or the rotor assembly 116 by the fan 136. The air directed in the axial direction through the generator 106 by the fan 136 may be a primary airflow.

The disclosed example power system 100 includes sets of fan blades 132, 134 extending from the axial end faces 124, 126 of the rotor core 120. For instance, a first set of one or more fan blades 132 extends from the first axial end face 124 of the rotor core 120 and a second set of one or more fan blades 134 extends from the second axial end face 126 of the rotor core 120. In this way, the sets of fan blades 132, 134 extend into the space between the axial end faces 124, 126 of the generator 106 and the housing 112 itself and/or a fan 136 (within the housing 112). In examples in which the first axial end face 124 is opposite the second axial end face 126, the first set of fan blades 132 extend along a shaft axis A (e.g., an axis aligned with the shaft in an axial direction) in a first direction and the second set of fan blades 134 extend along the shaft axis A in a second direction opposite to the first direction. In other examples, the sets of fan blades 132, 134 may extend from one or more additional or alternative faces of the rotor core 120. Although the power system 100 is illustrated in FIG. 1 as including both a first set of fan blades 132 and a second set of fan blades 134, other example power systems may only include one of the first set of fan blades 132 or the second set of fan blades 134. The plurality of fan blades 132, 134 may be made of any suitable material. For example, the plurality of fan blades 132, 134 may be made of plastic, metal, or another material.

In examples in which the rotor assembly 116 includes an insulating shell, the insulating shell may be constructed (e.g., molded, machined, assembled, etc.) with the fan blades 132, 134. In examples in which the rotor assembly 116 does not include the insulating shell but instead includes an insulative coating (e.g., varnish), the rotor core 120 may include the sets of fan blades 132, 134 and the insulative coating may be on at least a portion of the rotor core 120 and the fan blades 132, 134. In other examples in which the power system 100 includes both the insulating shell and the insulative coating, either the insulating shell or the rotor core 120 may include the plurality of fan blades 132, 134. In such examples, the insulative coating may be on at least a portion of one or more of the rotor core 120, the plurality of fan blades 132, 134, and/or the insulating shell. In other examples, the plurality of fan blades 132, 134 may be constructed (e.g., molded, machined, assembled, etc.) as a separate component and coupled (e.g., attached) to the axial end face 124, 126 of the rotor core 120 or insulting shell. In such examples, the plurality of fan blades 132, 134 may be attached to the rotor core 120 or insulting shell (e.g., individually and/or as a collection or an assembly) in any suitable manner.

The fan blades 132, 134 generates an airflow proximate (e.g., next to, around, within, etc.) the generator 106 as the rotor assembly 116 is rotated by the engine shaft 138. For example, the plurality of fan blades 132, 134 generates an airflow proximate to the rotor assembly 116 and/or the stator assembly 114. The airflow generated by the sets of fan blades 132, 134 may be considered one or more secondary airflow(s). The secondary airflow(s) generated by the sets of fan blades 132, 134 directs the air in a generally circumferential direction within the generator 106 (or within the housing 112). The secondary airflow(s) cool one or both of the rotor assembly 116 or the stator assembly 114. For example, the secondary airflow(s) may route air through one or more of the rotor winding 122 or the stator windings 128. The disclosed power system 100, including the primary airflow from the fan 136 and the secondary airflow from the sets of fan blades 132, 134, has improved cooling in comparison to conventional power systems. The fan blades 132, 134 of the disclosed power system 100 also provide lateral mechanical support of the rotor windings 122 of the rotor assembly 116 in addition to inducing secondary airflows.

Figure 2:
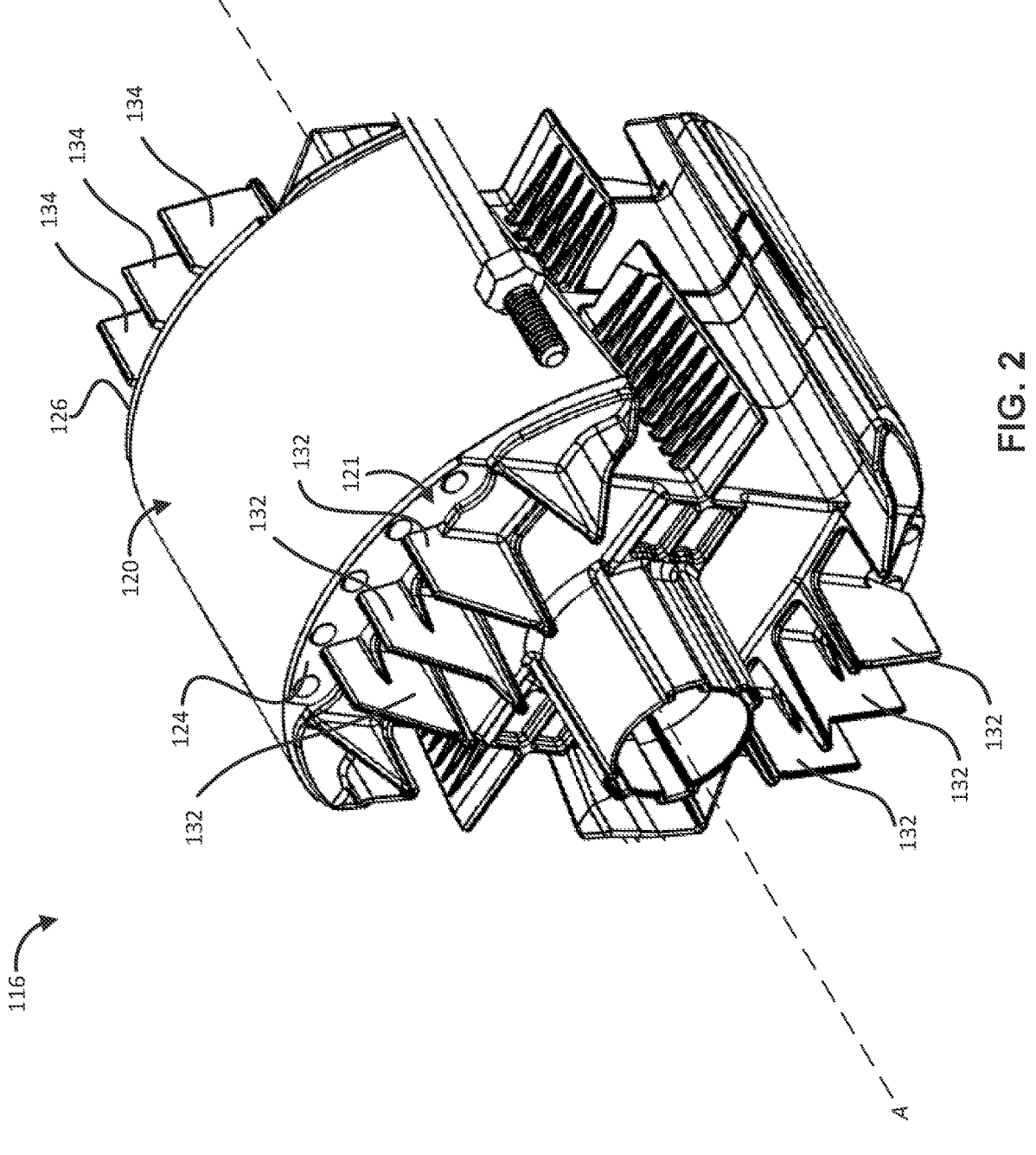
FIG. 2 is a perspective view of the axial end face of the rotor core including the plurality of fan blades of the power system of FIG. 1.

FIG. 2 is a perspective view of the rotor core 120, including the insulating shell 121, the fan blades 132, 134 of the power system 100 of FIG. 1. Each fan blade of the fan blades 132, 134 illustrated in FIG. 2 is rigidly coupled to the axial end face 124, 126. As the rotor core 120 rotates about the shaft axis A (e.g., when the rotor assembly 116 is driven by the engine shaft 138), the axial end face 124 likewise rotates about the shaft axis A. Because the plurality of fan blades 132, 134 are rigidly coupled to the axial end face 124, 126, the plurality of fan blades 132, 134 remain stationary relative to the axial end face 124, 126 while the rotor assembly 116 is rotated by the engine shaft 138. In this way, as the axial end face 124, 126 rotates, the plurality of fan blades 132, 134 are rotated circumferentially around the shaft axis A.

The sets of fan blades 132, 134 may have any suitable configuration. For example, as illustrated in FIG. 2, the plurality of fan blades 132, 134 are substantially parallel to each other (e.g., in the axial direction along the shaft axis A). In other examples, all or a portion of one or more of the fan blades 132, 134 may be angled with respect to the shaft axis A. For instance, in such examples, each of the fan blades 132, 134 may include a first portion that is angled with respect to the shaft axis A and a second portion that is substantially parallel to the shaft axis A. Moreover, in some examples, all or a portion of the fan blades 132, 134 may be arranged radially on the axial end face 124, 126. In still other examples, all or a portion of one or more of the fan blades 132, 134 may be angled (e.g., non-parallel) with respect to others of the fan blades 132, 134 in the same set (e.g., on the same axial end face). Additionally, or alternatively, each fan blade of the plurality of fan blades 132, 134 may be curved. In examples in which one or more fan blades of the plurality of fan blades 132, 134 is curved, the one or more fan blades may be curved in one, two, or three dimensions.

Figure 3:
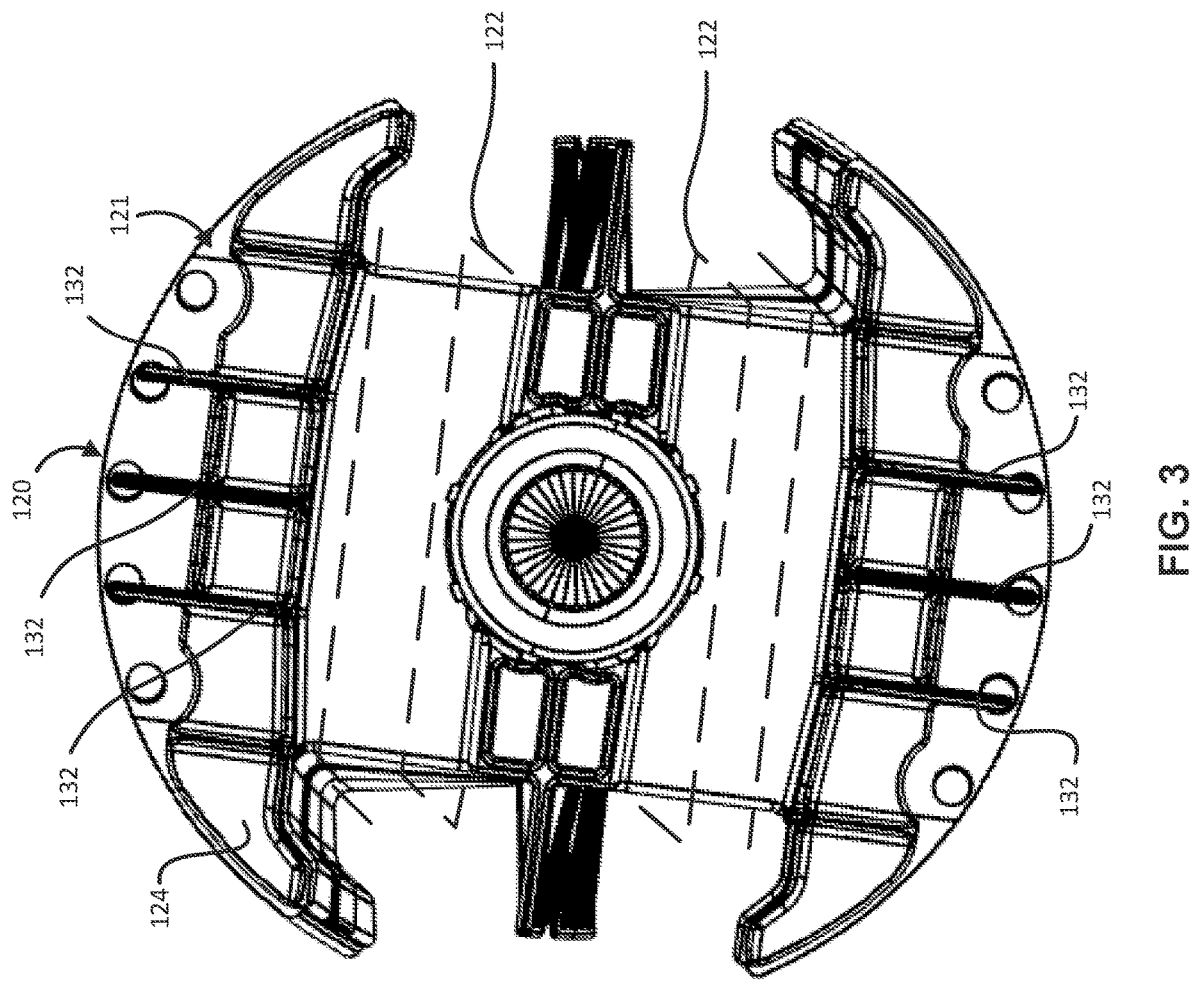
FIG. 3 is an axial end view of the rotor assembly including the rotor core, rotor windings, and the plurality of fan blades of the power system of FIGS. 1-2.

FIG. 3 is an axial end view of the rotor assembly 116 including the rotor core 120, rotor windings 122, and the plurality of fan blades 132 of the power system 100 of FIGS. 1-2. As seen in FIG. 3, the rotor windings 122 wrap around at least a portion of the rotor core 120. In some examples, the sets of fan blades 132, 134 extend at least partially beyond the rotor windings 122 in a radial direction. For example, as seen in FIG. 3, each fan blade of the plurality of fan blades 132 is radially beyond the rotor windings 122. In other examples, the sets of fan blades 132, 134 do not extend beyond the rotor windings 122 in the radial direction, or may be aligned with the rotor windings 122 in the radial direction.

The fan blades 132, 134 may have any suitable shape. FIGS. 4A-4G are block diagrams illustrating various example implementations of the fan blades 132, 134 of FIGS. 1-3. The shapes of the fan blades illustrated in FIGS. 4A-4G are for example only. In other examples, one or more of the fan blades 132, 134 may have a different shape than illustrated herein. FIG. 4A illustrates a quadrilateral fan blade; FIG. 4B illustrates a swept fan blade; FIG. 4C illustrates a tapered swept fan blade; FIG. 4D illustrates a clipped delta fan blade; FIG. 4E illustrates a trapezoidal fan blade; FIG. 4F illustrates a swept clipped delta fan blade; and FIG. 4G illustrates a ranked fan blade. The shapes of the fan blades disclosed herein may circulate the secondary airflow within the generator 106 more effectively than some other shapes. As one example, the quadrilateral, swept, tapered swept, clipped delta, trapezoidal, swept clipped delta, and/or ranked fan blades disclosed herein may provide more effectively cooling than triangular and/or delta shaped fan blades. As mentioned above, any of the example fan blades 132 having any of the example shapes, or other shapes, may be angled, curved, and/or otherwise arranged with respect to the axial end face of the rotor assembly, others of the fan blades 132, and/or the shaft axis A.

In some examples, each fan blade of the plurality of fan blades 132, 134 may be substantially the same as the other fan blades of the plurality of fan blades 132, 134. In other examples, one or more fan blades of the plurality of fan blades 132, 134 may be different (e.g., in shape, orientation, size, etc.) than one or more other fan blades of the plurality of fan blades 132, 134.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A power system comprising:
an engine configured to output mechanical power via a shaft; and
a generator coupled to the shaft, and comprising a rotor assembly and a stator assembly, wherein the rotor assembly comprises:
a rotor winding;
a rotor core coupled to the shaft and mechanically supporting the rotor windings with respect to the shaft;
an insulating shell between the rotor core and the rotor winding; and
a plurality of fan blades extending from at least one face of the rotor core, wherein the fan blades are configured to generate an airflow proximate the rotor assembly while the rotor assembly is being rotated by the shaft, and the fan blades are configured to provide lateral mechanical support to the rotor winding.

2. The power system as defined in claim 1, wherein the plurality of fan blades extend at least partially beyond the rotor winding in a radial direction.

3. The power system as defined in claim 1, wherein the plurality of fan blades are substantially parallel to each other.

4. The power system as defined in claim 1, wherein the insulating shell comprises the plurality of fan blades.

5. The power system as defined in claim 1, wherein the rotor core comprises the plurality of fan blades, the rotor assembly further comprising an insulative coating on at least a portion of the rotor core and a portion of the plurality of fan blades.

6. The power system as defined in claim 1, further comprising a fan coupled to the shaft.

7. The power system as defined in claim 6, wherein the generator fan is configured to provide a primary air flow in an axial direction through the generator.

8. The power system of claim 7, wherein the plurality of fan blades is configured to provide a secondary air flow in a circumferential direction within the generator.

9. The power system as defined in claim 8, wherein the secondary air flow is configured to cool at least one of the stator assembly or the rotor assembly.

10. The power system of claim 1, wherein at least a portion of each fan blade of the plurality of fan blades is angled with respect to a shaft axis, wherein the shaft axis is an axis aligned with the shaft in an axial direction.

11. The power system of claim 10, wherein each fan blade of the plurality of fan blades comprises a first portion that is angled with respect to the shaft axis and a second portion that is substantially parallel to the shaft axis.

12. The power system as defined in claim 1, wherein the plurality of fan blades is a first plurality of fan blades and the axial end face is a first axial end face, the power system comprising a second plurality of fan blades extending from a second axial end face of the rotor core, the second plurality of fan blades configured to generate an airflow proximate at least one of the rotor assembly or the stator assembly while the rotor assembly is being rotated by the shaft.

13. The power system as defined in claim 12, wherein the first axial end face is opposite the second axial end face.

14. The power system as defined in claim 13, wherein the first plurality of fan blades extends from the first axial end face in a first direction along a shaft axis, wherein the shaft axis is an axis aligned with the shaft in an axial direction, and the second plurality of fan blades extends from the second axial end face in a second direction along the shaft axis, wherein the second direction is opposite of the first direction.

15. The power system as defined in claim 1, wherein each fan blade of the plurality of fan blades defines one of a quadrilateral, a swept, a tapered swept, a clipped delta, a trapezoidal, a swept clipped delta, or a ranked shape.

16. The power system as defined in claim 1, wherein each fan blade of the plurality of fan blades is curved.

17. The power system as defined in claim 1, further comprising one or more of:
welding-type conversion circuitry configured to convert electrical power from the generator to welding-type power;
an air compressor coupled to at least one of the electrical power from the generator or the mechanical power from the engine and configured to output compressed air;
a hydraulic pump configured to generate hydraulic pressure from at least one of the electrical power from the generator or the mechanical power from the engine; or
auxiliary power conversion circuitry configured to convert the electrical power from the generator to at least one of AC output power or DC output power.

18. The power system as defined in claim 1, wherein:
the plurality of fan blades is rigidly coupled to the axial end face,
the axial end face is configured to rotate while the rotor assembly is being rotated by the shaft, and
the plurality of fan blades remains stationary relative to the axial end face while the rotor assembly is being rotated by the shaft.

19. The power system as defined in claim 1, wherein one or more of the fan blades comprise a surface facing the rotor winding, the surface configured to provide the lateral support to the rotor winding.

* * * * *